US007996021B2

(12) United States Patent
Brauel et al.

(10) Patent No.: US 7,996,021 B2
(45) Date of Patent: Aug. 9, 2011

(54) LOCATION DETERMINATION IN A WIRELESS COMMUNICATION NETWORK

(75) Inventors: Eric S. Brauel, Spring, TX (US); James J. Ganthier, Spring, TX (US); Sean Burke, Cypress, TX (US); William Caldwell Crosswy, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2134 days.

(21) Appl. No.: 10/186,111

(22) Filed: Jun. 28, 2002

(65) Prior Publication Data

US 2004/0002343 A1    Jan. 1, 2004

(51) Int. Cl.
*H04W 24/00* (2009.01)
(52) U.S. Cl. ............... 455/456.6; 455/456.1; 455/456.2; 455/456.3; 455/550.1; 455/404.2
(58) Field of Classification Search .... 455/414.1–414.3, 455/456.1–456.3, 456.5–456.6; 342/450, 342/457; 340/825.28
See application file for complete search history.

(56) References Cited

U.S. PATENT DOCUMENTS

| 6,414,635 | B1 * | 7/2002 | Stewart et al. | 342/457 |
| 6,434,479 | B1 * | 8/2002 | Kondou et al. | 701/203 |
| 6,618,005 | B2 * | 9/2003 | Hannah et al. | 342/357.1 |
| 6,664,925 | B1 * | 12/2003 | Moore et al. | 342/451 |
| 2002/0164952 | A1 * | 11/2002 | Singhal et al. | 455/41 |
| 2002/0184331 | A1 * | 12/2002 | Blight et al. | 709/217 |
| 2006/0105784 | A1 * | 5/2006 | Zellner et al. | 455/456.3 |

FOREIGN PATENT DOCUMENTS

JP      11201769 A   *  7/1999

OTHER PUBLICATIONS

Keith Cheverst et al.; *Sharing (Location) Context to Facilitate Collaboration Between City Visitors*, Distributed Multimedia Research Group, Department of Computing, Lancaster University (pp. 1-5).
Sarni Levijoki,; *Privacy vs Location Awareness*, Helsinki University of Technology, Department of Computer Science; (pp. 1-16); [online] Retrieved from the Internet; URL:http://www.hut.fi~slevijok/privacy_vs_locationawareness.htm.

* cited by examiner

*Primary Examiner* — Charles N Appiah
*Assistant Examiner* — Willie J Daniel, Jr.

(57) ABSTRACT

A wireless network permits wireless devices to determine their own location and receive location-based services. The network includes a communication server coupled to a plurality of access points and at least one mobile wireless device that wirelessly communicates through the access points. Each wireless device includes a location table through which the wireless device can determine its physical location. The location table includes the physical location of the various access points indexed by their network addresses. When the wireless device communicates with an access point, the access point provides the wireless device its address. The wireless device uses the address of the access point as an index into the location table to determine its own location based on the location of the access point. Once the wireless device has determined its own physical location, it requests location-based services from or through the communication server.

22 Claims, 2 Drawing Sheets

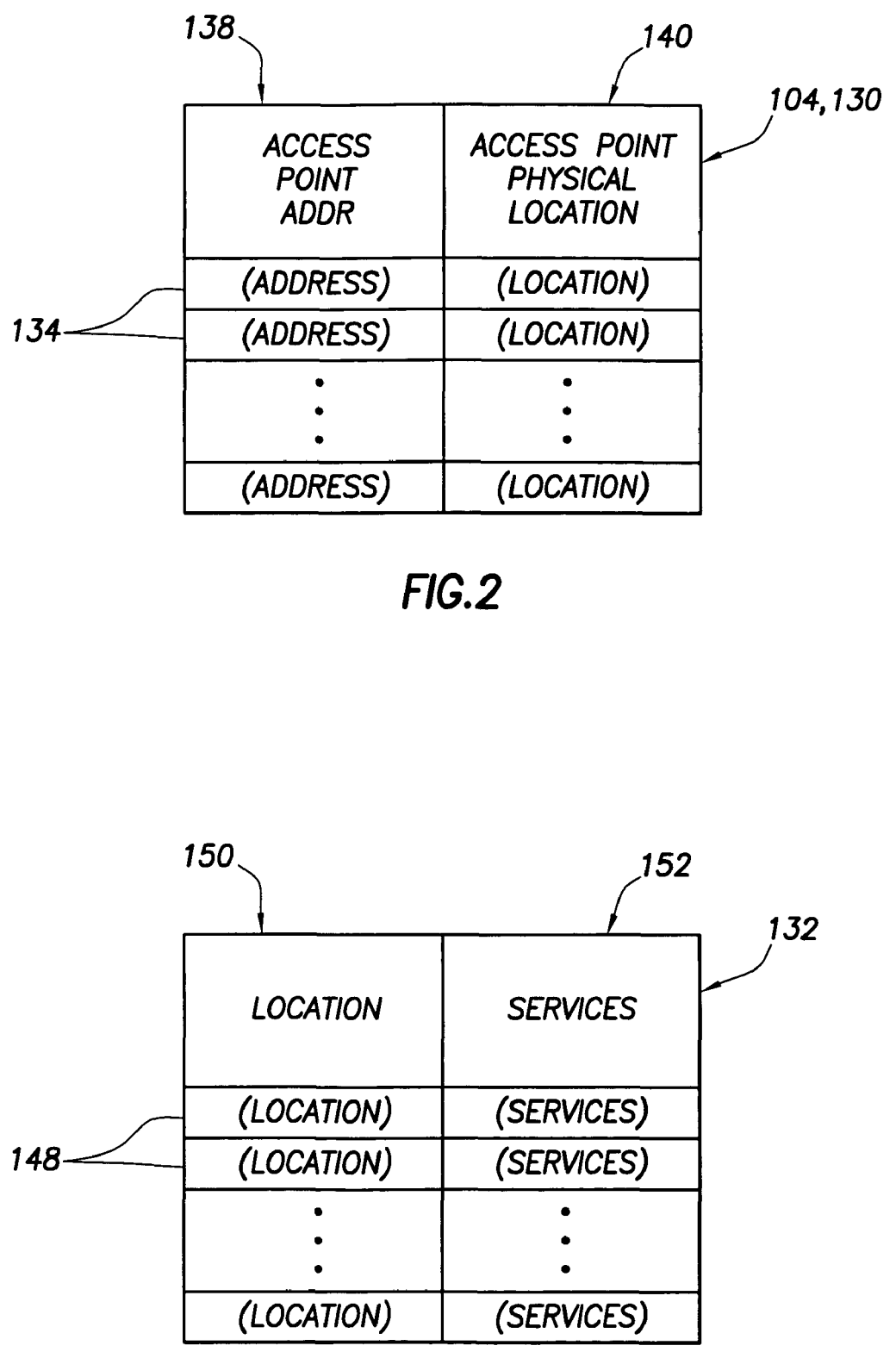

| ACCESS POINT ADDR | ACCESS POINT PHYSICAL LOCATION |
|---|---|
| (ADDRESS) | (LOCATION) |
| (ADDRESS) | (LOCATION) |
| ⋮ | ⋮ |
| (ADDRESS) | (LOCATION) |

FIG.2

| LOCATION | SERVICES |
|---|---|
| (LOCATION) | (SERVICES) |
| (LOCATION) | (SERVICES) |
| ⋮ | ⋮ |
| (LOCATION) | (SERVICES) |

FIG.3

LOCATION DETERMINATION IN A WIRELESS COMMUNICATION NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to determining the location of a communication device in a communication network. More particularly, the invention relates to determining location of a wireless communication device in a wireless communication network. Still more particularly, the invention relates to a wireless communication device determining its own location in a wireless network and requesting location-based services from the network.

2. Background Information

Wireless communication networks have become increasingly popular. In such networks, electronic devices such as notebook computers, hand held computers and the like can access a network via a wireless communication link. This permits, for example, an employee of a corporation that has a wireless network to carry his notebook computer from his office to a conference room for a meeting and still have full access to email, network files, and the like. Numerous other uses for a wireless communication network besides a corporate work environment are possible and this disclosure encompasses all such uses.

As noted in "Privacy vs Location Awareness" by Sami Levijoki, incorporated herein by reference, it is desirable to be able to determine the current location of a portable wireless device. The device's location then can be used to provide services to the device that is relevant to the device's location. An example given in the Levijoki article is that if the user of a wireless device is in Helsinki, Finland and the user is hungry, Helsinki restaurant information is more useful than information about restaurants in Paris. Besides providing information to the wireless device most pertinent to its location, device location can also be used as a security feature. That is, an employee's notebook computer located inside the employer's building might be granted a full set of access privileges, while the same device located outside the building might be granted a reduced set of access privileges.

To provide information based on device location, it is first necessary to determine the location of the device. A number of techniques for determining the location of wireless mobile devices have been suggested. In some techniques, the communication system determines or estimates the location of a portable device. In other techniques, the portable device itself is involved in determining its own location. Known implementations of both techniques have disadvantages. For those techniques in which the network determines the location of a wireless device, privacy may be an issue. That is, location of the user and the user's wireless device may be information that would be desirable to maintain confidential. The confidentiality of the user's location may be breached if the network is able to determine the device's location.

Those techniques that have been proposed for permitting the wireless device to assist in the determination as to its location are generally fairly complex. For example, the "signal strength" technique described in the Levijoki article requires signals from three different base stations to be received by a cellular telephone. The cell phone determines its location from an analysis of the three signals based on the assumption that signal strength is inversely proportional to distance. This implementation is complex and not particular exact because of environmental influences such as the user himself or herself. Further, an ultrasound-based method can be used but requires a number of ultrasound transmitters to be located at various locations in the ceiling of a building. Each wireless device includes a microphone and calculates its position based on the travel time of an ultrasonic signal between the transmitters and the wireless device. This implementation is also relatively complex.

What would be desirable is to have a wireless communication system in which the wireless devices themselves can determine their own location and do so in a relatively simple, straightforward manner.

BRIEF SUMMARY OF THE PREFERRED EMBODIMENTS OF THE INVENTION

The problems noted above are solved in large part by a wireless communication network that permits wireless devices to determine their own location. In accordance with a preferred embodiment of the invention, the network includes a communication server coupled to a plurality of access points and at least one, and typically more than one, mobile wireless device (e.g., a notebook computer, handheld computer, email device, etc.) that wirelessly communicates with any of the access points. The mobile wireless device thus has access to the network via any one of the access points. The mobile wireless device includes a location table through which the wireless device can determine its physical location. The location table includes the physical location of the various access points indexed by their network addresses. When the wireless device communicates with an access point, the access point provides the wireless device its address. The wireless device uses the address of the access point to which it is currently communicating as an index into the location table to determine its own location based on the location of the access point as provided by the location table. The wireless device preferably determines its location to be the same as the location of the access point to which it is communicating. The location table preferably is created by a network administrator and downloaded to the wireless devices during wireless device initialization or at predetermined time intervals (e.g., once per hour, once per day, etc.).

Once the wireless device has determined for itself its physical location, it requests location-based services from or through the communication server. This can occur in accordance with one of at least two ways. First, the wireless device can formulate requests to the network for services based on its awareness of its location. In this way, the communication server remains unaware of the location of the wireless device. Instead, the communication server simply provides whatever services the wireless device requests. In this embodiment, the wireless device may be provided ahead of time with a list of services that are available for the various locations in which the wireless device may be located.

Alternatively, once it is has determined its location, the wireless device can transmit that location to the communication server, which then uses the wireless device's location to provide location-based services to the wireless device. In this embodiment, the communication server or other network attached device is provided with a list of services pertaining to each location in which the wireless device may be located. Further still, the choice of services that a wireless device presents to its user can be a list of services provided from the communication server. Since in this embodiment the communication server knows the location of the wireless device, the communication server may download only the list of services that correspond to the wireless device's location. This embodiment, of course, entails disclosing the physical location of the wireless device to the network, but if privacy of location information is not of paramount concern, then this embodiment may be acceptable.

In addition to requesting services based just on physical location, the wireless device can request services as a function of user preferences stored on the wireless device. In this embodiment, each user specifies which services he or she wishes to have access to at each location and/or the quality or state of each service. For example, the network administrator may permit the Internet access service to a wireless device at a particular location, but a user might wish to further limit the Internet access to also use a software filter to restrict access to various types of web sites. The limitations placed on a particular service by a user's preferences may be location specific or global in nature.

Moreover, the mobile wireless device is primarily responsible for determining its own location and does so in a fairly easy, straightforward manner not requiring additional equipment such as ultrasonic sensors and the like. Further, the wireless device can receive location-based services from the wireless network without the network knowing the location of the wireless device, at least in some embodiments. Privacy is enhanced in this manner. These and other advantages will become apparent upon reviewing the following disclosures.

BRIEF DESCRIPTION OF THE DRAWINGS

For a detailed description of the preferred embodiments of the invention, reference will now be made to the accompanying drawings in which:

FIG. 2 shows an embodiment of a location table that is downloaded into a wireless device and used by the wireless device to determine its location; and FIG. 3 shows an embodiment of a location services table stored in a wireless device.

NOTATION AND NOMENCLATURE

Figure 1:
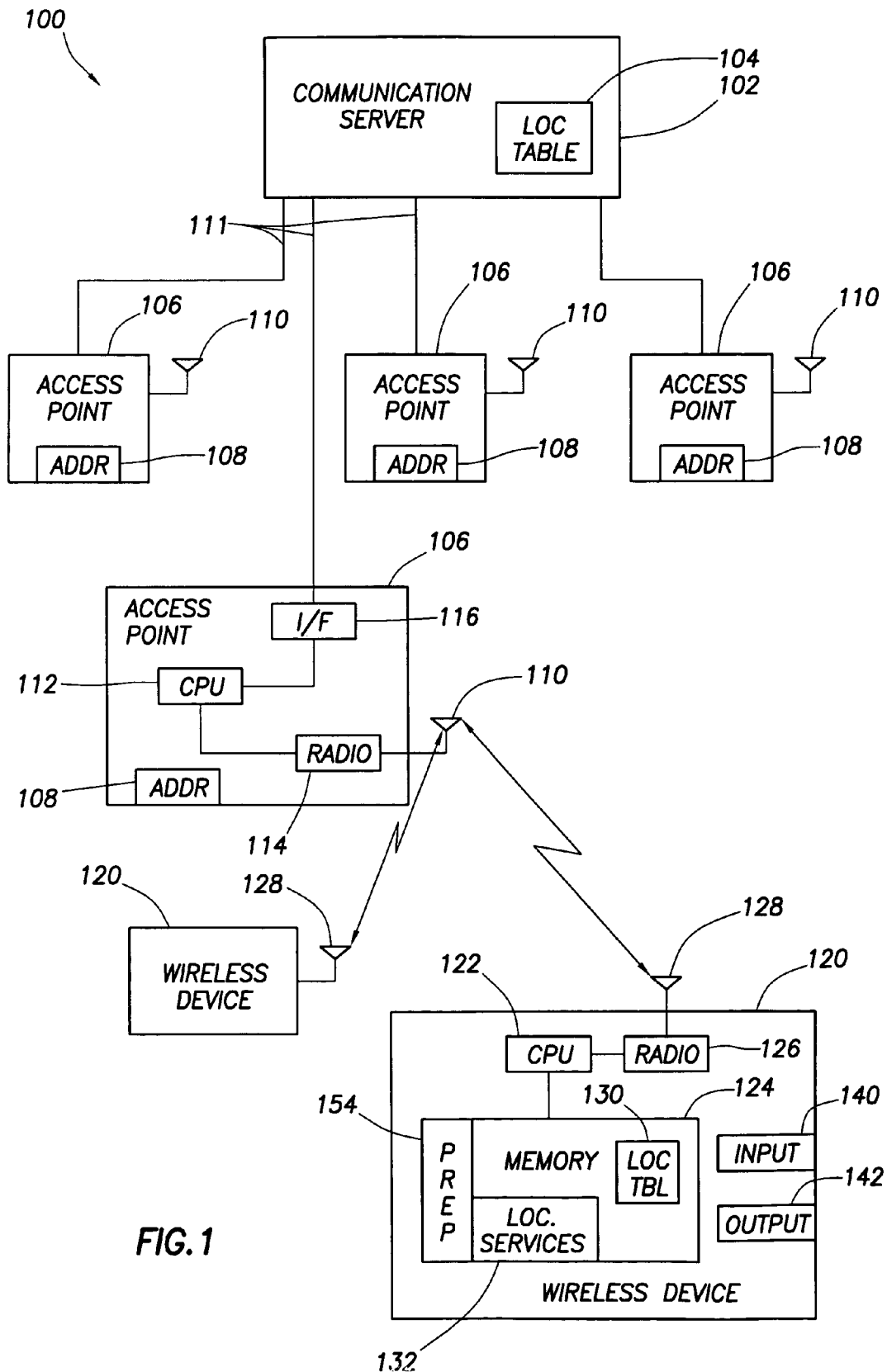
FIG. 1 shows a system diagram of a wireless communication network constructed in accordance with the preferred embodiment of the invention.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

Referring to FIG. 1, a wireless communication network 100 is shown constructed in accordance with the preferred embodiment of the invention. As shown, the network 100 includes a communication server 102 coupled to a plurality of access points 106 which are capable of wireless communications with one or more mobile wireless communication devices 120. Via the communication server 102, the wireless devices 120 can communicate with other wireless devices 120 or various resources (not shown) attached to the network such as network attached storage devices, application servers and other types of resources.

The access points 106 comprise a communication entry onto the network 100 by each wireless communication device. Each access point preferably includes a wired data connection 111 to the communication server 102 as well as a wireless communication link to the wireless communication devices 120. Each access point 106 may include a central processing unit ("CPU") 112, a radio transceiver 114 coupled to an antenna 110 and a bus interface 116. Other components may be present as desired. The CPU 112 preferably controls the operation of the access point 106 and transmission of data between the communication server 102 and the wireless communication devices 120. The radio transceiver 114 causes data to be transmitted through the antenna 110 to the wireless device's antenna and receives wirelessly transmitted data from the wireless device. The communication protocol implemented by the radio 114 for the wireless communication can be anything desired. Suitable examples include the IEEE 802.11 and Bluetooth protocols. The wireless communication can be implemented with any type of transmission techniques such as radio infra-red, and the like. This disclosure is not limited to any particular type of wireless communication.

Each wireless communication device 120 preferably includes a CPU 122, memory 124 and a radio transceiver 126 coupled to an antenna 128. An input device 140, such as a keyboard or scroll wheel, and an output device (e.g., display) 142 are also preferably included as part of the wireless communication device. The particular function(s) performed by the wireless communication devices 120 are not particularly relevant to the scope of this disclosure. The wireless devices 120 may comprise notebook computers, handheld computers, wireless email devices, cellular telephones, etc.

Each access point 106 preferably is assigned an address 108 which permits efficient communications between the communication server 102 and the access points 106. The address 108 of each access point 106 preferably is established in accordance with whatever communication protocol is used to facilitate communications over the data connections 111. The access point's address preferably is stored in memory (not specifically shown). Such memory may be separate random access memory ("RAM") accessible the CPU 112 or may be part of the interface 116.

In accordance with the preferred embodiment of the invention, the wireless communication devices 120 determine their own location. Preferably, this determination is made based on information provided by the communication server 102 or other network attached entity. In accordance with the preferred embodiment shown in FIG. 1, the network-provided information comprises a location table 104 in the communication server 102. The location table 104 preferably includes physical location information of each of the access points 106. One embodiment of the location table 104 is shown in FIG. 2. As shown, the table 104 preferably includes a plurality of entries 134 corresponding to each of the access points 106. Each entry includes an address 138 assigned to an access point and physical location information 140. The location table 104 can be constructed in accordance with any one of variety of techniques. For example, via a workstation (not shown) a network administrator can enter physical location information for each of the access points. The network administrator would know the physical location of the access points and can readily find out the address of each access point. The format of the location information entered by the network administrator can be in accordance with any desired or predetermined format. Preferably, the location information includes a value that can be understood by the communication server 102 or other network attached resource to provide location-based services or information to the wireless communication devices 120.

The location table 104 preferably is downloaded to the wireless communication devices 120 and stored in the devices' memory 124 as table 130. Location table 130 downloaded to the wireless communication devices 120 may the same as, or different than, the location table 104 stored on the communication server 102. For example, the communication server 102 may download a version of the location table 104 that does not include location information for every access point, but rather only a subset of the access points. Further, the communication server 102 may download the location table 130 to each wireless device 120 at any desired time. The location table may be downloaded while, or just after, the wireless device initializes, at predefined time intervals (once per day, once per hour, etc.), at other times or when triggered by other events (e.g., each time the wireless device attempts to access the network 100).

In accordance with the wireless communication protocol implemented between the access points 106 and the wireless communication devices 120, each wireless device 120 is informed of the address 108 associated with the access point through the wireless device is currently communicating. As the wireless device 120 is moved from the proximity of one access point 106 to another, the wireless device is informed by the new access point of the address associated with the new access point. The wireless device 120 knowing the address of the access points preferably is in accordance with conventional wireless communication protocols.

Once a wireless communication device 120 is made aware of the address of the access point to which it is currently communicating (which presumably is the closest access point), the wireless device 120 can use the location table 130 stored in its memory 124 to determine its own location. The wireless communication device 120 uses the address of the relevant access point 106 as an index into its table 130 to retrieve the physical location information from the table.

The physical location of the access point 106 to which a wireless device 120 is currently communicating is a good approximation of the location of the wireless device itself. Of course, the resolution of wireless device location is a function of the communication range between the access points 106 and the wireless devices 120. In the 802.11 standard, the communication range is approximately 300 meters which means that the wireless device 120 can determine its location to 300 meter accuracy. Of course, the communication range between access points and wireless devices can be varied as desired to achieve greater or less location resolution.

Armed with the access point's physical location, and thus its own location, the wireless communication device 120 can request and receive location-based services. As used herein the term "services" refers to applications, data, access privileges or any other type of information service. This can occur in accordance with one of at least two ways. First, the wireless communication device 120 can formulate requests to the network for services based on its awareness of its location. In this way, the communication server 102 remains unaware of the location of the wireless device 120. Instead, the communication server simply provides whatever services the wireless device requests.

The wireless device preferably contains location services indexed by location. Such information may be stored in a location services table 132 in the memory 124 of each wireless device 120. An exemplary embodiment of location services table 132 is shown in FIG. 3. As shown in FIG. 3, the table 132 comprises one or more entries 148. Each entry includes location information 150 and the services 152 that are available for the corresponding location. The services 152 may include a single service or a plurality of services. The services 152 corresponding to a particular location preferably are those services that a wireless device 120 located at that location is permitted to use. Thus, once the wireless device 120 determines its location using the location table 130 (FIG. 2), the wireless device uses the location information 140 obtained from location table 130 as an index into location services table 132 to determine which services it is permitted to use. At that point, the wireless device 120 has a list of those services it can request from or through the communication server 102; the wireless device preferably will not request other services and, as such, the communication server 102 will not provide such other services to the wireless device.

Alternatively, once it is has determined its location, the wireless device 120 transmits that location to the communication server 102. The communication server 102 then can use the wireless device's location information to provide location-based services and information to the wireless device. In this embodiment, the location services table 132 can be stored in the communication server 102 or other network attached device. Using the wireless device's location as an index into the location services table, the communication server 102 will only provide a wireless device those services the wireless device requests and that are available as indicated in the location services table 132. Further still, the choice of services that a wireless device presents to its user can be a list of services provided from the communication server 102. Since in this embodiment the communication server 102 knows the location of the wireless device, the communication server 102 can download only the list of services that correspond to the wireless device's location. This embodiment, of course, entails disclosing the physical location of the wireless device to the network, but if privacy of location information is not of paramount concern, then this embodiment may be acceptable.

The location table 130 and location services table 132 disclosed above are described in terms of a table. However, the information contained in those tables need not be stored in the form of a table, per se. Alternatively, the information contained in those tables may be stored in any desired form.

In addition to being a function of location, the services provided via the communication server 102 to the wireless devices 120 can be further refined by preferences set up by the user of the wireless device. In this embodiment, each user specifies which services he or she wishes to have access to at each location and/or the quality or state of each service. For example, the network administrator may permit the Internet access service to a wireless device at a particular location, but a user might wish to further limit the Internet access to also use a software filter to restrict access to various web sites. The limitations placed on a particular service by a user may be on a location-by-location basis meaning that the user might wish certain limitations to be placed on certain services when accessed from a particular location, but not from other locations. Alternatively, the user-specified limitations might be global in nature meaning that the limitations are to be applied to the service regardless of location. The limitations are preferably specified by the user via the input device 140 in the wireless device 120 and are stored as a preferences file 154 in the wireless device's memory 124.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A mobile wireless communication device which wirelessly communicates with one of a plurality of access points, each of said access points coupled to a communication server, comprising:
   a CPU;
   a transceiver coupled to said CPU;
   a memory device coupled to said CPU;
   a location table stored in said memory, said location table providing the physical location and addresses of the plurality of access points; and
   said CPU determines the physical location of the mobile wireless communication device based on the physical location of the access point to which the mobile wireless communication device is currently communicating by receiving the address of the access point to which the mobile wireless communication device is currently communicating with and using the address as an index for the location table in order to retrieve the corresponding physical location of the access point from the location table; and
   wherein said wireless communication device's CPU requests services from the communication server based on the mobile wireless communication device's physical location as determined by said CPU; and
   wherein said communication server remains unaware of the location of the wireless communication device.

2. The mobile wireless communication device of claim 1 wherein said location table is downloaded to the mobile wireless communication device by the communication server.

3. The mobile wireless communication device of claim 1 wherein during initialization of the mobile wireless communication device said location table is downloaded to the mobile wireless communication device by the communication server.

4. The mobile wireless communication device of claim 1 wherein at predefined time intervals said location table is downloaded to the mobile wireless communication device by the communication server.

5. The mobile wireless communication device of claim 1 further including a location services table stored in said memory and containing a service corresponding to each of a plurality of locations, said CPU uses said location services table to request services from the communication server.

6. The mobile wireless communication device of claim 5 wherein said location services table is downloaded to the mobile wireless communication device by the communication server.

7. The mobile wireless communication device of claim 1 further including preferences stored in said memory by a user of said mobile wireless communication device and said CPU requests services from the communication server based on the mobile wireless communication device's physical location as determined by said CPU and based on said preferences.

8. The mobile wireless communication device of claim 1 further including preferences stored in said memory of said mobile wireless communication device, and said CPU requests restricts access to various websites based on the mobile wireless communication device's physical location as determined by said CPU and based on said preferences.

9. A wireless communication network, comprising:
   a communication server;
   a plurality of access points coupled to said communication server;
   a wireless communication device that wirelessly couples to an access point;
   a location table stored in said wireless communication device, said location table providing the physical location and address of the access points; and
   wherein the wireless communication device determines its physical location by receiving the address of the access point and using the address as a pointer for the location table in order to determine the physical address of the access point to which the mobile wireless communication device is currently communicating; and
   wherein said wireless communication device requests services from the communication server based on the mobile wireless communication device's physical location as determined by said wireless communication device; and
   wherein said communication server remains unaware of the location of the wireless communication device.

10. The wireless communication network of claim 9 wherein said location table is downloaded to the mobile wireless communication device by the communication server.

11. The wireless communication network of claim 9 wherein during initialization said location table is downloaded to the mobile wireless communication device by the communication server.

12. The wireless communication network of claim 9 wherein at predefined time intervals said location table is downloaded to the mobile wireless communication device by the communication server.

13. The wireless communication network of claim 9 wherein said mobile wireless communication device receives the address of the access point to which the wireless communication device communicates and uses the address to look up the location in the location table corresponding to the address received from the access point.

14. The wireless communication network of claim 9 wherein said wireless communication device requests services from the communication server based on the mobile wireless communication device's physical location as determined by said CPU.

15. The wireless communication network of claim 14 further including a location services table stored in said wireless communication device and containing a service corresponding to each of a plurality of locations, said wireless communication device uses said location services table to request services from the communication server.

16. The wireless communication network of claim 15 wherein said location services table is downloaded to the mobile wireless communication device by the communication server.

17. The wireless communication network of claim 14 further including preferences stored in said wireless communication device by a user of said mobile wireless communication device and said wireless communication device requests services from the communication server based on the mobile wireless communication device's physical location and based on said preferences.

18. The wireless communication network of claim 9 wherein said wireless communication device comprises a CPU, a transceiver coupled to said CPU and a memory device coupled to said CPU, said location table stored in said memory device.

19. The mobile wireless network of claim 9 further including preferences stored in said wireless communication device, and said wireless communication device requests restricts access to various websites based on the wireless communication device's physical location as determined by said wireless device and based on said preferences.

20. A method of determining the location of a wireless device that wirelessly communicates with a plurality of access points included as part of a wireless network, said access points couple to a communication server, comprising:

(a) the wireless device receiving an address from the access point to which the wireless device is currently communicating;

(b) the wireless device using the address as an index into a look up table prestored in the wireless device to find the physical location of the access point;

(c) the wireless device determining the physical location of the wireless device based on the physical location of the access point while a communication server associated with the wireless network remains unaware of the determined physical location; and (d) the wireless device requesting services from the wireless network based on the determined physical location.

21. The method of claim 20 wherein (c) includes determining the physical location of the wireless device to be the physical location of the access point.

22. The method of claim 20 further including requesting services from the communication server based on the physical location of the wireless device and preferences associated with the user of the wireless device.

* * * * *

UNITED STATES PATENT AND TRADEMARK OFFICE
CERTIFICATE OF CORRECTION

PATENT NO.         : 7,996,021 B2                                   Page 1 of 1
APPLICATION NO.    : 10/186111
DATED              : August 9, 2011
INVENTOR(S)        : Eric S. Brauel et al.

It is certified that error appears in the above-identified patent and that said Letters Patent is hereby corrected as shown below:

In column 9, line 22, in Claim 20, delete "couple" and insert -- coupled --, therefor.

Signed and Sealed this
Thirteenth Day of November, 2012

David J. Kappos
*Director of the United States Patent and Trademark Office*